United States Patent [19]

Ruffner

[11] Patent Number: 5,136,479

[45] Date of Patent: Aug. 4, 1992

[54] DEVICE AND METHOD FOR CREATING AN AREAL LIGHT SOURCE

[75] Inventor: Bryan J. Ruffner, Annandale, Va.

[73] Assignee: E-Systems, Inc., Dallas, Tex.

[21] Appl. No.: 541,828

[22] Filed: Jun. 19, 1990

[51] Int. Cl.⁵ .............................. G02B 5/28; F21V 8/00
[52] U.S. Cl. .......................................... 362/29; 362/31; 362/330; 362/331; 362/332; 362/800
[58] Field of Search .................... 350/338, 339 D, 345; 362/31, 800, 268, 329, 330, 331, 332

[56] References Cited

U.S. PATENT DOCUMENTS

| | | | |
|---|---|---|---|
| 3,752,974 | 8/1973 | Baker et al. | 362/31 |
| 3,853,386 | 12/1974 | Ritter et al. | 350/164 |
| 3,910,681 | 10/1975 | Elliott et al. | 350/345 X |
| 4,043,636 | 8/1977 | Eberhardt et al. | 350/345 |
| 4,059,916 | 11/1977 | Tachihara et al. | 362/31 |
| 4,524,410 | 6/1985 | Kawakatsu et al. | 362/297 |
| 4,573,766 | 3/1986 | Bournay, Jr. et al. | 350/345 |
| 4,659,183 | 4/1987 | Suzawa | 350/345 |
| 4,729,068 | 3/1988 | Ohe | 362/31 |
| 4,933,814 | 6/1990 | Sandi | 362/26 |
| 4,937,716 | 6/1990 | Whitehead | 362/31 X |

Primary Examiner—Ira S. Lazarus
Attorney, Agent, or Firm—Rogers & Killeen

[57] ABSTRACT

A device and method to convert light from a point source into an areal source of displayed light. The reflective faces of dielectric mirrors enclose a point source of light. The mirrors repeatedly reflect the light from the point source inside the enclosure without significant absorption, thereby achieving a random distribution of position coordinates for the light rays departing the areal transmissive surface on the outside of the enclosure. The device and method may be used for backlighting a display or for other areal lighting systems.

25 Claims, 2 Drawing Sheets

DEVICE AND METHOD FOR CREATING AN AREAL LIGHT SOURCE

BACKGROUND OF THE INVENTION

The present invention relates to the conversion of light emitting from a point source into light uniformly radiating from an area and, more particularly, to an apparatus and method for uniformly backlighting a display with a point source of light such as a light emitting diode. Disclosure Document No. 182598 relates to the present invention.

Providing a light of uniform intensity to an area larger than the surface area of the immediate source of light has long been recognized as a problem. This problem is particularly acute when the area to be lit uniformly is relatively large compared to the size of the light source, such as in a liquid crystal display or a light panel. A light source that is small compared to the area to be lit is referred to herein as a "point source." The magnitude of the problem increases dramatically as the distance between the point source and the area to be lit is reduced.

Uniform distribution of light is achieved by the nearly random distribution of position coordinates for light rays departing the transmissive surface. In other words, it is achieved by increasing positional entropy. In backlighting devices positional entropy is increased when light is reflected a large number of times before it either is absorbed or departs the backlighting device. An effective backlighting device, therefore, must simultaneously achieve two goals: (a) reducing the medium-induced absorption losses that diminish light intensity as light travels from its source to the area to be lit, and (b) scattering the light to increase positional entropy. These goals, however, conflict because effective scattering is achieved through numerous reflections which also increase travel distance, thereby increasing absorption. Thus, it becomes necessary to maximize a theoretical "reflection-to-absorption" ratio by increasing reflectivity while decreasing, or at least without increasing, absorption.

Several solutions have been advanced to solve this problem. A plurality of small lights, such as light emitting diodes (LEDs), have been used to light a large area. A device with numerous light sources reduces the requirement for increased reflections, but provides uniform light only when the sources of light are closely spaced so that absorption losses in the light conveying medium are not noticed. The use of numerous lights may cause other problems such as increased power requirements and heat. See, for example, U.S. Pat. No. 4,573,766 to Bournay, Jr., et al., wherein LEDs are placed in holes in the edge of a solid light emitting panel.

A transparent plate with surface irregularities to diffuse light and plural embedded grains to reflect light has also been proposed. In such devices the number of reflections (i.e., uniformity) is increased by increasing the number of embedded grains. Such an approach, however, reduces the area of uniform light distribution because the light is prevented from penetrating far into the plate by the mass of embedded grains. See, for example, U.S. Pat. No. 3,984,176 to Harai, et al.

In another proposed solution, the point light source is recessed in a transmitting member covered by a reflective material. This solution is also inefficient because the resulting reflection-to-absorption ratio is inherently low. (See, for example, U.S. Pat. No. 4,229,783 to Eberhardt, U.S. Pat. No. 4,659,183 to Suzawa and U.S. Pat. No. 4,714,983 to Lang.)

It is also known to use a single dielectric mirror to increase the contrast ratio of a liquid crystal display in ambient lighting. The mirror generally consists of plural layers of materials having alternating high and low index of refraction. The dielectric mirror in U.S. Pat. No. 3,910,681 to Elliot, et al., for example, has multiple layers of alternating high and low refractive coatings, each layer one-quarter wavelength thick, for a wavelength below the lower limit of the visible spectrum.

It has not been known, however, to use dielectric mirrors to back light a display by converting light emitting from a point source into light uniformly radiating from an area.

Accordingly, it is an object of the present invention to provide a novel lighting apparatus, and method using light from a point source uniformly radiating from an area.

It is a further objective of the present invention to provide backlighting for a display that increases the number of reflections and reduces the absorption of light.

It is yet a further objective of the present invention to provide backlighting that has small power requirements, and minimal heat diffusion problems.

It is another objective of the present invention to provide backlighting from a point source of light disposed in an enclosure formed with dielectric mirrors.

These and many other objects and advantages will be readily apparent to one skilled in the art to which the invention pertains from a perusal of the claims and the following detailed description of preferred embodiments when read in conjunction with the appended drawings.

THE DRAWINGS

FIG. 5 is a pictorial view in partial section of an embodiment of the backlighting device of the present invention.

FIG. 6 is a pictorial view in perspective of an embodiment of the present invention forming a symbol.

DETAILED DESCRIPTION OF PREFERRED EMBODIMENTS

The term backlighting as used herein refers not only to backlighting for a display but also to other areal lighting systems such as light panels and strips, drafting tables, color LCD (i.e., television), X-ray readers, sign and key pad illumination, photographic processing and spectral lighting effects such as for musical instruments.

Figure 1:
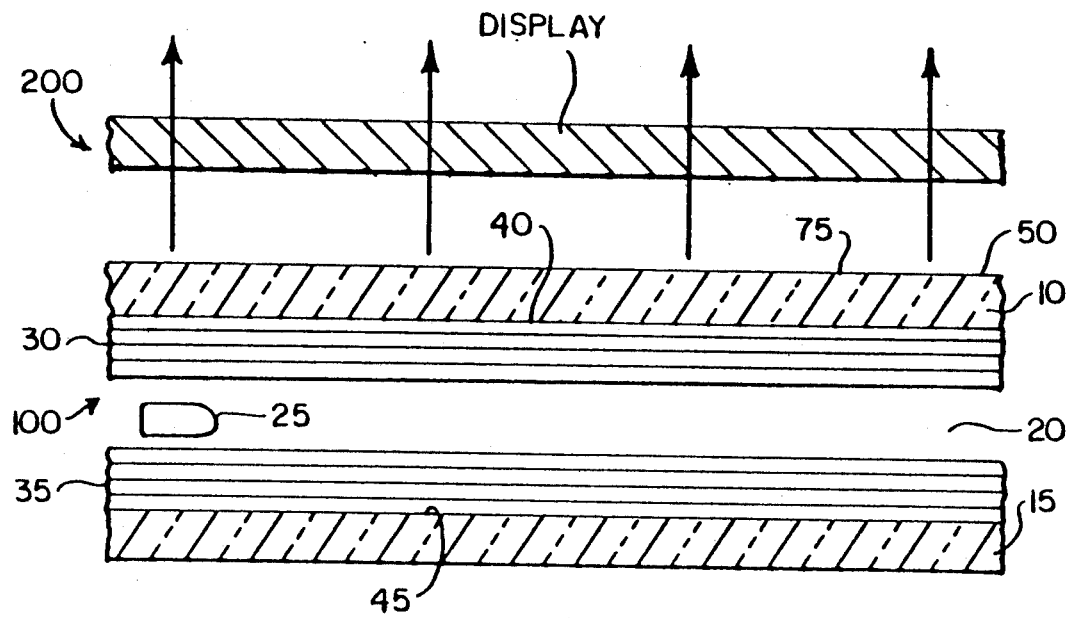
FIG. 1 is an elevation in vertical cross section of a portion of an embodiment of the backlighting device of the present invention.

With reference now to the figures where like elements have been given like numerical designation to facilitate an understanding of the present invention, and particularly with reference to FIG. 1, the backlighting device 100 may be constructed of substrates 10 and 15 spaced apart to form a cavity 20 with a light source 25 therebetween. Multiple layers 30 and 35 are carried by the cavity-facing surfaces 40 and 45 of the substrates 10 and 15 to form dielectric mirrors 50.

Figure 2:
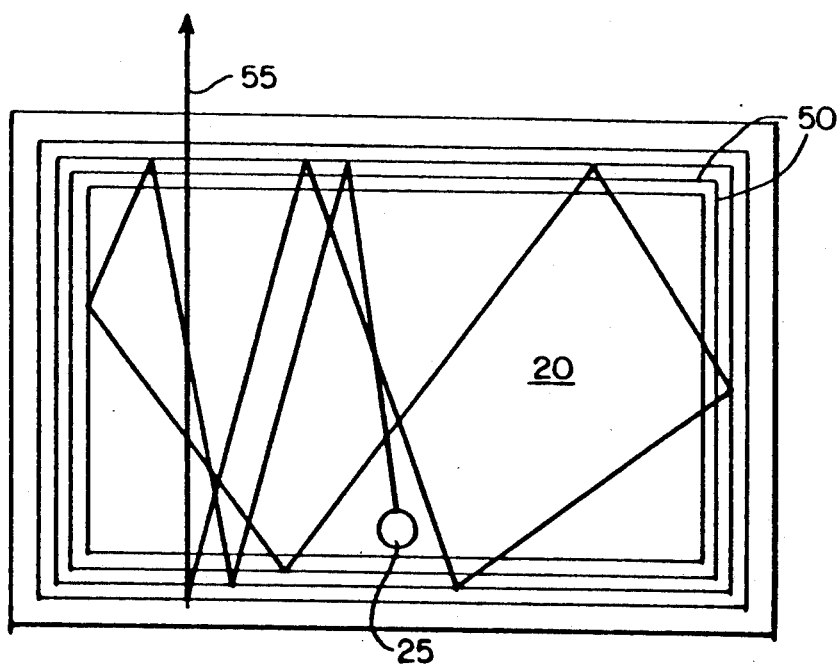
FIG. 2 is a schematic diagram of light reflections in an embodiment of the present invention.

As may be seen in FIG. 2 the sides of the cavity may be substantially enclosed with dielectric mirrors 50 to prevent light leaks. Leaks will reduce the efficiency of the present invention by permitting light to escape before it is effectively scattered. As shown by the path 55 of a typical photon, light emitted by the light source 25 may be reflected by the dielectric mirrors 50 numerous times before escaping from the cavity 20. (A cavity with openings for electrical leads is "substantially" enclosed.)

With further reference to FIG. 1, the backlighting device 100 may be placed in position adjacent a display 200 or other device through which the light emitted from the backlighting device is to travel. (The arrows in the figures indicate the general direction of light travel.) The spatial relationship of the backlighting device 100 to the display 200 is dependent on the type of display and is not an element of this invention.

The substrates 10 and 15 may be flat or curved, may be rigid or flexible, and may be formed of plastic, acrylic, polycarbonate, or other generally transparent materials. They may be formed from a single folded substrate or from two or more substrates and may take any shape without limitation. The top substrate 10 is nearest the display 200 and has a display-facing surface that desirably conforms to the contours and size of the display 200. The bottom substrate 15 has cavity-facing surface 45 that desirably conforms to the contours and size of the cavity-facing surface 40 of the top substrate 10. Precise alignment of the cavity-facing surfaces is not required. The cavity may contain air, other appropriate gas, or may be evacuated. In any event, the cavity provides a low-absorption path for light as it is reflected by the dielectric mirrors 50.

The two cavity-facing surfaces 40 and 45 carry plural layers 30 and 35, transforming each cavity-facing surface into a dielectric mirror. The plural layers 30 and 35 have alternatively high and low refractive index and may be formed by repeated applications of optical coating materials to the cavity-facing surfaces 40 and 45. Any appropriate optical coating materials known in the art may be used. However, the efficiency of the present invention is improved when the ratio of the refractive indices of optical coating materials in adjacent layers exceeds approximately 1.5.

Figure 3:
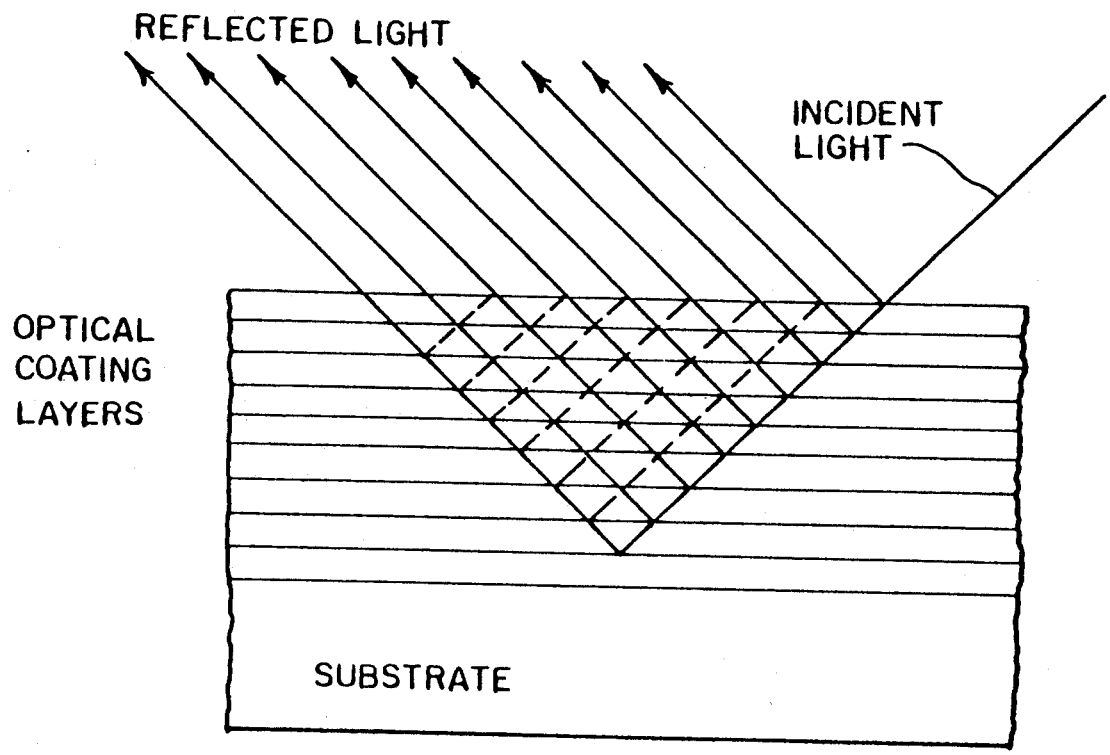
FIG. 3 is a depiction of the reflection and transmission of light in the layers of optical coating material of the present invention.

The operation of the present invention may be more clearly seen with reference to FIG. 3. Light is both reflected and transmitted by each layer. The amount reflected depends on the angle of incidence and the indices of refraction of adjacent layers. Light incident at greater than the critical angle[1] is completely reflected. At other angles of incidence, more light is transmitted by each layer as the angle of incidence decreases from the critical angle, until almost all light is transmitted for normally incident rays. However, nearly total reflection of normally incident light may be achieved by stacking multiple layers. By so doing, the small amount of normally incident light reflected by each layer is combined to achieve nearly total reflection.

Each dielectric mirror normally may include 20 to 50 layers, although fewer or more layers may be required for specific applications. The number of layers is determined by the ratio of the refractive indices of adjacent layers and the amount of reflection desired. A completely reflective mirror, such as may be used on bottom substrate 15 in FIG. 1, requires more layers than a partially transmissive mirror, such as may be used on top substrate 10 in FIG. 1. Fewer layers may be needed to achieve the desired reflectivity when the ratio of refractive indices of adjacent layers is increased.

To determine the number of layers, consideration should be given to the most difficult light path to reflect, that is light rays arriving perpendicular to the dielectric mirror. As is well known, the percentage R of normally incident light reflected at the border of two refractive materials was shown by Fresnel to be

[1] The angle of incidence for which the angle of refraction is 90° is called the critical angle.

$$R = ((N_i - Nt)/(Ni + Nt))^2 \quad (1)$$

where $N_i$ is the index of refraction of the material the light ray is leaving, and $Nt$ is the index of refraction of the material the light ray is entering. By providing layers that are about one-half the light wavelength thick, the reflections of the normally incident light from plural layers may add constructively. Accordingly, the total percent reflection $R_{TOT}$ is approximately:

$$R_{TOT} = R \sum_{i=0}^{n} (1 - R)^i \quad (2)$$

where n is the number of layers.

Thus, by varying R and n, the reflectivity of a dielectric mirror may be established. For example, when the ratio of refractive indices is 2.0, 11.1% of the normally incident light is reflected at each interface. By stacking approximately 30 layers, each approximately one-half wavelength thick, a total reflectivity of about 97% may be achieved for normally incident light. At other incident angles a larger portion of the light is reflected by each layer, so the total reflectivity of the mirror is even greater for light not normally incident.

The light source 25 may be positioned in the cavity 20 in any convenient location. Desirably, it requires little power (for example, 100 mw) and generates a minimum amount of heat. It should also be small, such as a point source, and have long life. To this end, the light source 25 may be a light emitting diode (LED). Such an LED may be 5 to 15 one-thousandths of an inch thick. Unconventionally powered light source, such as chemical lights, may also be used. The light source may emit light within a relatively narrow wavelength spectrum, the center wavelength of which is referred to herein as the "wavelength" of the light source. For example, a display requiring red backlighting would use a device of the present invention with a red (650 millimicron wavelength) LED and layers approximately 325 millimicrons thick. It is to be understood that while it is desirable that the light source 25 emit light of a particular wavelength, such a source may emit light having a predominant wavelength or even numerous wavelengths (non predominating), albeit at reduced backlighting efficiency.

After providing for display backlighting, it is often still desirable to use ambient lighting when it is available. The described backlighting will reflect most efficiently the wavelengths in ambient light that also exist in the backlighting source 25. This nonuniform reflection will tend to change the color of the reflected ambient light. If this effect is undesirable, a thin layer of a broadband reflector, such as silver, can be placed between the backlighting cavity 20 and the display 200.

This broadband coating 75 could be located on the substrate 10 surface closest to the ambient light source.

Figure 4:
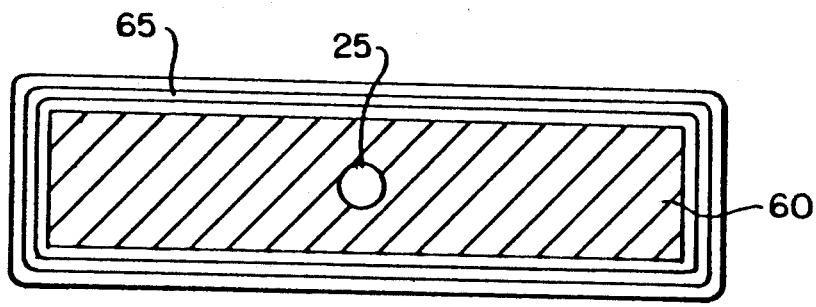
FIG. 4 is a cross sectional view of another embodiment of the present invention.

With reference now to FIG. 4, a further embodiment of the present invention may enclose a point light source in dielectric mirrors 50 with a small or no cavity 20. The light source 25 may be enclosed in a single, substantially transparent substrate 60 having plural dielectric mirror-forming layers 65 on its external surfaces. The reflective faces of the mirrors enclose the light source, albeit with greater absorption losses than found in the embodiment with the cavity 20. The number and composition of the layers may be adjusted so that light from the source 25 emanates uniformly from the layers 65 on one or more of the external surfaces of the substrate 60.

With reference to FIG. 5, in another embodiment of the present invention the cavity 20 may be formed by folding a reflective substrate 15 over the edges of a transmissive substrate 10.

The present invention may also be used to create various visual images without using a separate display. For example, by increasing the number of layers on a portion of a transmissive surface, a shaded area may be created. As may be seen in FIG. 6, patterns of shaded areas may form a symbol for conveying information.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a perusal hereof.

I claim:

1. A device for converting a point source of light into an areal source of light having uniform luminosity comprising:
   (a) a point source of light for emitting light having a predominant wavelength;
   (b) plural substrates substantially enclosing said point source of light in a cavity, one of said substrates being uniformly optically transmissive for providing said areal source of light, said cavity being substantially enclosed so that light is not emitted therefrom except from said optically transmissive substrate; and
   (c) plural layers of optical coating materials carried by the cavity-forming interior surface of each of said substrates, said plural layers having alternating high and low indices of refraction for forming dielectric mirrors so that light from said light source is reflected from and refracted by said plural layers a plural number of times so as to be distributed uniformly on said optically transmissive substrate before being emitted therefrom, said optically transmissive substrate carrying uniformly thereon fewer of said plural layers than the other said substrates so as to be optically transmissive,
   each of said plural layers having a thickness less than said predominant wavelength so as to reduce absorption,
   whereby light from said point source emanates generally uniformly rom said optically transmissive substrate.

2. The device as defined in claim 1 wherein each of said plural layers has a thickness approximately equal to one-half of said predominant wavelength.

3. The device as defined in claim 1 wherein the ratio of indices of refraction of adjacent ones of said plural layers is at least 1.5.

4. The device as defined in claim 3 wherein at least one of said plural layers is metallic.

5. The device as defined in claim 1 wherein at least one of said plural substrates is folded over the edge of said optically transmissive substrate.

6. The device as defined in claim 1 wherein said substrates are adapted for forming a curved shape.

7. The device as defined in claim 1 wherein said substrates substantially enclose said point source of light in a gas-filled cavity.

8. The device as defined in claim 1 wherein said substrates substantially enclose said point source of light in an evacuated cavity.

9. The device as defined in claim 1 wherein said point source of light is a light emitting diode.

10. A device for providing uniform backlighting with light of a predetermined wavelength, comprising:
    (a) a substantially transparent substrate;
    (b) plural substantially non-light absorbing layers covering the surfaces of said substrate, said plural layers having alternating high and low indices of refraction so that said substrate is substantially enclosed by dielectric mirrors and so that light within said substrate is reflected and refracted by said layers so as to be uniformly distributed on an outermost one of said layers on a light transmissive exterior surface,
    said substrate having a surface with sufficient of said plural layers arrayed uniformly thereon to form said light transmissive exterior surface; and
    (c) a light source for emitting light of said wavelength disposed within said substrate,
    whereby light from said light source emanates uniformly from said light transmissive surface to provide backlighting.

11. The device as defined in claim 10 wherein each of said plural layers has a thickness approximately one-half of said wavelength.

12. A backlighting device comprising plural dielectric mirrors, a first one of which comprises plural layers of uniformly arrayed optical coating materials, said mirrors substantially enclosing a point source of light so that light from said point source is reflected and refracted by said mirrors so as to be uniformly distributed on an external surface of said first one of said mirrors.

13. A method of converting a source of light into an areal source of light comprising the steps of:
    (a) positioning a point source of light in a cavity substantially enclosed by plural substrates;
    (b) applying plural layers of optical coating materials to the cavity-facing surfaces of said substrates to form dielectric mirrors so that light form said point source is reflected and refracted by said mirrors so as to provide a uniform distribution of light on an exterior areal surface of one of said substrates when said point source is emitting light, said one substrate having a uniform number of said layers applied thereto; and
    (c) allowing light from said source to emanate from said exterior areal surface of said layered substrate so that an areal light source of uniform is provided.

14. A method for converting light of a predetermined wavelength emitting form a point source into light uniformly emanating from an area comprising the steps of:

(a) forming a cavity with the facing mirrored surfaces of plural spaced-apart dielectric mirrors, said dielectric mirrors having plural layers of coatings, each of said layers being one-half said wavelength thick;

(b) positioning a low-power point source of light at said wavelength within said cavity; and (c) reflecting light from said light source from a first one of said dielectric mirrors having a uniform number of said layers and partially from a second one of said dielectric mirrors, and radiating light from an area formed with the external surface of said second one of said dielectric mirrors.

15. A method of backlighting a display comprising the steps of:

(a) substantially enclosing a point source of light with one or more dielectric mirrors so that light from said point source reflects from the reflective faces of said dielectric mirrors, said dielectric mirrors having uniformly applied plural layers of optical coating materials; and (b) emanating the light from said point source from a surface of said dielectric mirrors not facing said point source whereby the display is backlift by the emanated light.

16. A device for converting a point source of light into an areal source of light comprising:

(a) a point source of light;

(b) plural substrates substantially enclosing said point source of light, one of said substrates being optically transmissive for providing said areal source of light; and (c) plural layers of uniformly applied optical coating materials carried by the surfaces of said substrates, said plural layers having alternating high and low indices of refraction for forming dielectric mirrors so that light from said point source of light is reflected and refracted by said plural layers so as to be uniformly distributed on said optically transmissive substrate, wherein the number of said plural layers on said one optically transmissive substrate enables transmission of light therethrough, and wherein the number of said plural layers on the other of said substrates is sufficient to enable reflection of substantially all light impinging thereon, whereby light from said point source emanates generally uniformly from said light transmissive surface.

17. The device as defined in claim 16 wherein said point source of light is adapted to emit light of a predetermined wavelength and wherein each of said plural layers has a thickness approximately equal to one-half of said predetermined wavelength.

18. The device as defined in claim 16 wherein the ratio of indices of refraction of adjacent ones of said plural layers is at least 1.5.

19. A device for backlighting with light of a predetermined wavelength comprising:

(a) plural dielectric mirrors forming a substantially enclosed cavity, one of said mirrors having a light transmissive external surface, each of said mirrors having a reflective surface facing said cavity, and each of said mirrors comprising plural uniformly applied layers of optical coating materials with each of the layers having a thickness approximately equal to one-half said predetermined wavelength and wherein the ratio of indices of refraction of adjacent ones of said layers is at least 1.5; and (b) a point source of light disposed within said cavity, wherein said one mirror having a light transmissive external surface comprises fewer of said plural layers than the other said mirrors so as to enable transmission of light therethrough, whereby light form said source of light emanates uniformly from said external surface.

20. A device for providing uniform backlighting with light of a predetermined wavelength, comprising:

(a) a substantially transparent substrate;

(b) plural layers covering the surfaces of said substrate, said plural layers having alternating high and low indices of refraction so that said substrate is substantially enclosed by dielectric mirrors, said substrate having plural surfaces with sufficient of said plural layers to reflect substantially all light impinging thereon and at least one light transmissive surface with sufficient of said plural layers uniformly applied to enable transmission of light therethrough; and (c) a light source for emitting light of said wavelength disposed within said substrate, whereby light from said light source emanates uniformly from said light transmissive surface to provide backlighting.

21. The device as defined in claim 20 wherein each of said plural layers has a thickness approximately equal to one-half of said predetermined wavelength.

22. The device as defined in claim 20 wherein the ratio of indices of refraction of adjacent ones of said plural layers is at least 1.5.

23. A method of converting a source of light into an areal source of light comprising the steps of:

(a) positioning a point source of light in a cavity substantially enclosed by plural substrates;

(b) uniformly applying plural layers of optical coating materials to the cavity-facing surfaces of said substrates to form dielectric mirrors, wherein the number of said plural layers is sufficient to enable light to be transmitted through one of said substrates and is sufficient to reflect substantially all light impinging on the other said substrates; and (c) allowing light from said source to emanate from an exterior areal surface of said one light transmissive substrate so that an areal light source of uniform intensity is provided.

24. The method as defined in claim 23 wherein said point source of light is adapted to emit light of a predetermined wavelength and wherein each of said plural layers has a thickness approximately equal to one-half of said predetermined wavelength.

25. The device as defined in claim 23 wherein the ratio of indices of refraction of adjacent ones of said plural layers is at least 1.5.

* * * * *